US006415300B1

(12) United States Patent
Liu

(10) Patent No.: US 6,415,300 B1
(45) Date of Patent: Jul. 2, 2002

(54) METHOD OF PERFORMING A HIGH-PERFORMANCE BACKUP WHICH GAINS EFFICIENCY BY READING INPUT FILE BLOCKS SEQUENTIALLY

(75) Inventor: Peter Chi-Hsiung Liu, Woodcliff Lake, NJ (US)

(73) Assignee: Syncsort Incorporated, Woodcliff Lake, NJ (US)

( * ) Notice: Subject to any disclaimer, the term of this patent is extended or adjusted under 35 U.S.C. 154(b) by 0 days.

(21) Appl. No.: 09/347,931

(22) Filed: Jul. 6, 1999

(51) Int. Cl.[7] .............................................. G06F 12/00
(52) U.S. Cl. ..................... 707/204; 707/200; 709/200; 709/217; 711/161; 711/162; 711/112
(58) Field of Search ................................ 707/200–205, 707/1–10; 709/200, 217–219; 711/111, 112, 114, 161, 162, 154

(56) References Cited

U.S. PATENT DOCUMENTS

| 4,210,961 A | 7/1980 | Whitlow et al. |
| 4,686,620 A | 8/1987 | Ng |
| 4,760,526 A | 7/1988 | Takeda et al. |
| 5,133,065 A | 7/1992 | Cheffetz et al. |
| 5,150,473 A | 9/1992 | Zulch |

(List continued on next page.)

OTHER PUBLICATIONS

What is, "NTFS (NT file system)," http://www.whatis.com/htfs.htm, web site printout dated Apr. 15, 1999.
What is, "cluster," http://www.whatis.com/cluster,htm, website printout dated Apr. 15, 1999.
Via–Centrale Réseaux, "NTFS Documentation," http//www.via.ecp.fr/~regis/ntfs/new/, web site printout dated Apr. 14, 1999.
Via–Centrale Réseaux, "NTFS Documentation: FILE record," http://www.via.ecp.fr/~regis/ntfs/new/FILE.html#inode, web site printout dated Apr. 15, 1999.
Via–Centrale Réseaux, "NTFS Documentation: Glossary," http://www.via.ecp.fr~regis/ntfs/new/glossary.html#File, web site printout dated Apr. 15, 1999.
Via–Centrale Réseaux, "NTFS Documentation: $MFT," http://www.via.ecp.fr/~regis/ntfs/new/MFT.html, web site printout dated Apr. 15, 1999.
Mark Russinovich, "Inside NTFS: NT's native file system—past, present and future" http://www.scit.wlv.ac.uk/~cm1924/scited/reading/filesys/ntfs/.html, web site printout dated May 31, 2000.
Frank Sorenson, "About Hard Disk[a]," http://pel.cs.by-u.edu/~sorenson/research/disks.html, web site printout dated May 31, 2000.

(List continued on next page.)

*Primary Examiner*—Hosain T. Alam
*Assistant Examiner*—Joon Hwan Hwang
(74) *Attorney, Agent, or Firm*—Hughes Hubbard & Reed LLP; Ronald Abramson; Sheryl L. Sandridge

(57) ABSTRACT

An improved method of performing a high-performance backup of a computer system is described, which reduces disk read time and thus gains efficiency by reading input file blocks sequentially rather than the order in which the block appear in the original files. The improved method involves reading the working directory maintained by the operating system to determine all of the blocks associated with the set of files or other data aggregations to be backed up. The data block identities so determined are sorted in accordance with their physical location on the disk, thereby providing a sequential order for reading. The data to be backed up from the random access storage device or devices is read in this sequential order, and written to the backup media. There is also stored in conjunction with the backup media a Catalog containing the names of the files in the backup set, the location of the file data blocks on the backup media, the proper ordering of the blocks in this original file, and any other desired file attribute information.

7 Claims, 6 Drawing Sheets

U.S. PATENT DOCUMENTS

| | | |
|---|---|---|
| 5,163,148 A | 11/1992 | Walls |
| 5,210,866 A | 5/1993 | Milligan et al. |
| 5,239,647 A | 8/1993 | Anglin et al. |
| 5,263,154 A | 11/1993 | Eastridge et al. |
| 5,276,860 A | 1/1994 | Fortier et al. |
| 5,276,865 A | 1/1994 | Thorpe |
| 5,321,832 A | 6/1994 | Tanaka et al. |
| 5,347,653 A | 9/1994 | Flynn et al. |
| 5,357,607 A | 10/1994 | Sathi et al. |
| 5,367,669 A * | 11/1994 | Holland et al. ............... 714/7 |
| 5,367,698 A | 11/1994 | Webber et al. |
| 5,404,508 A | 4/1995 | Konrad et al. |
| 5,408,654 A * | 4/1995 | Barry ....................... 707/101 |
| 5,410,694 A | 4/1995 | Uchida et al. |
| 5,416,840 A | 5/1995 | Cane et al. |
| 5,448,718 A | 9/1995 | Cohn et al. |
| 5,475,834 A | 12/1995 | Anglin et al. |
| 5,479,654 A | 12/1995 | Squibb |
| 5,485,608 A | 1/1996 | Lomet et al. |
| 5,497,483 A | 3/1996 | Beardsley et al. |
| 5,513,314 A | 4/1996 | Kandasamy et al. |
| 5,519,860 A | 5/1996 | Liu et al. |
| 5,546,536 A | 8/1996 | Davis et al. |
| 5,557,770 A | 9/1996 | Bhide et al. |
| 5,559,991 A | 9/1996 | Kanfi |
| 5,574,906 A | 11/1996 | Morris |
| 5,586,322 A | 12/1996 | Beck et al. |
| 5,592,665 A | 1/1997 | Lahaije |
| 5,604,862 A | 2/1997 | Midgely et al. |
| 5,617,566 A | 4/1997 | Malcolm |
| 5,649,196 A | 7/1997 | Woodhill et al. |
| 5,659,743 A | 8/1997 | Adams et al. |
| 5,684,991 A | 11/1997 | Malcolm |
| 5,715,452 A * | 2/1998 | Mori et al. ................. 395/617 |
| 5,720,026 A | 2/1998 | Uemura et al. |
| 5,737,763 A | 4/1998 | Hilditch |
| 5,761,667 A | 6/1998 | Koeppen |
| 5,765,173 A | 6/1998 | Cane et al. |
| 5,802,344 A | 9/1998 | Menon et al. |
| 5,819,082 A | 10/1998 | Marion |
| 5,829,045 A | 10/1998 | Motoyama |
| 5,842,222 A | 11/1998 | Lin et al. |
| 6,003,044 A * | 12/1999 | Pongracz et al. ........... 707/204 |

OTHER PUBLICATIONS

Eliezer Levy and Avi Silberschatz, "Incremental Recovery in Main Memory Database Systems," IEEE Transactions on Knowledge and Data Engineering, vol. 4, No. 6, pp. 529–540, Dec. 1992.

David A. Solomon, "Inside Windows NT: Windows NT File System (NTFS)," Second Edition, pp. 395–450 (Microsoft Press 1998).

Donald E. Knuth, "The Art of Computer Programming: Sorting and Searching," vol. 3, Second Edition, pp. 248–251; 356–379 (Addison–Wesley 1998).

* cited by examiner

METHOD OF PERFORMING A HIGH-PERFORMANCE BACKUP WHICH GAINS EFFICIENCY BY READING INPUT FILE BLOCKS SEQUENTIALLY

BACKGROUND OF THE INVENTION

1. Field of the Invention

This invention generally relates to the field of data processing and more particularly to high-performance backup of computers and computer workstations, including without limitation distributed backup of such systems over a network.

2. Description of the Related Art

Prior art backup methods generally provide for an "image" backup of an entire disk volume, or a "file-by-file" backup. An image backup copies the entire disk volume without regard to directory structure, and can be performed relatively quickly, although it does require time and space to copy the entire disk. However, since an image backup generally does not take account of directory and file information, such a backup does not support selective restoration of files. In order to be able to restore files selectively, generally a file-by-file backup has been required.

Conventionally, the files to be backed up in a file-by-file backup are accessed in accordance in the normal manner provided by the operating system, in which data is read from the disk in the logical order of file contents. The actual physical blocks of data on the disk corresponding to each file are not, however, generally stored in a contiguous or linear order. In practice, there is considerable physical discontinuity of recorded data blocks, both within individual files, and from file to file in a disk file system. Indeed, even if linearly recorded at the outset, the data blocks of files in a production computer system may become highly fragmented as blocks are read, revised and written over the course of normal usage. In normal operation, the operating system takes care of this, maintaining a directory which keeps track of the correspondence between the blocks of data that comprise a file, and the physical location of each block on the storage media. Yet the physical order of blocks is generally allowed to become discontinuous and fragmented.

The result of this disorder and fragmentation of raw disk data is that the process of reading files using normal operating system calls (or any other disk access methods that operate similarly) generally results in significant disk read head repositioning during the read operation. Since this mechanical movement can be the slowest operation on the computer, sometimes by orders of magnitude, reading a disk in this manner can be highly inefficient. A file-by-file backup that is constrained to read the disk in this manner will thus necessarily suffer from this significant inefficiency. Considerable improvement in backup operations can be obtained if this inefficiency can be overcome.

BRIEF SUMMARY OF THE INVENTION

Accordingly, it is an object of the present invention to provide an improved backup method which avoids the inefficiencies of normal file-by-file disk access. Among the objects of the present invention, therefore, are the following:

To reduce disk read time by reducing the amount of head repositionings necessary to read the backup input;

To achieve such reduction by performing sequential rather than random reads of the input file, to the extent feasible; and Despite having read the file in a physical sequential order, being able to keep track of the logical sequence of blocks as well, so that the file may be properly restored.

The foregoing and other objects of the invention are accomplished by reading the working directory maintained by the operating system to determine all of the blocks associated with the set of files or other data aggregations to be backed up. The data block identities so determined are sorted in accordance with their physical location on the disk, thereby providing a sequential order for reading. The data to be backed up from the random access storage device or devices is read in this sequential order, and written to the backup media. There is also stored in conjunction with the backup media a Catalog containing the names of the files in the backup set, the location of the file data blocks on the backup media, the proper ordering of the blocks in this original file, and any other desired file attribute information. The information in the Catalog makes it possible to restore in an efficient manner either individual files or entire file systems.

The manner in which the invention achieves these objects is more particularly shown by the drawings enumerated below, and by the detailed description that follows.

BRIEF DESCRIPTION OF THE DRAWINGS

The following briefly describes the accompanying drawings.

DETAILED DESCRIPTION OF THE PREFERRED EMBODIMENT

Figure 4A:
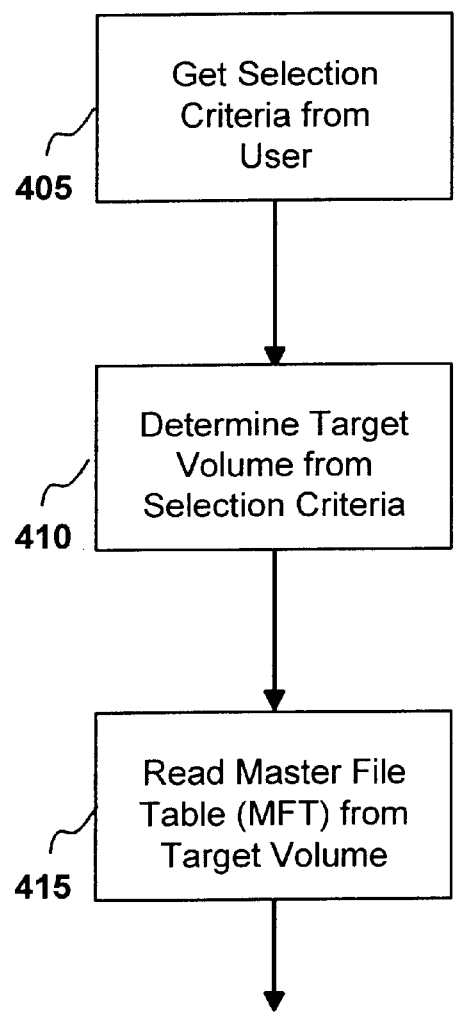
FIGS. 4A, 4B and 4C comprise the various sections of a flow chart showing the principal processing steps of the preferred embodiment.
Figure 4B:
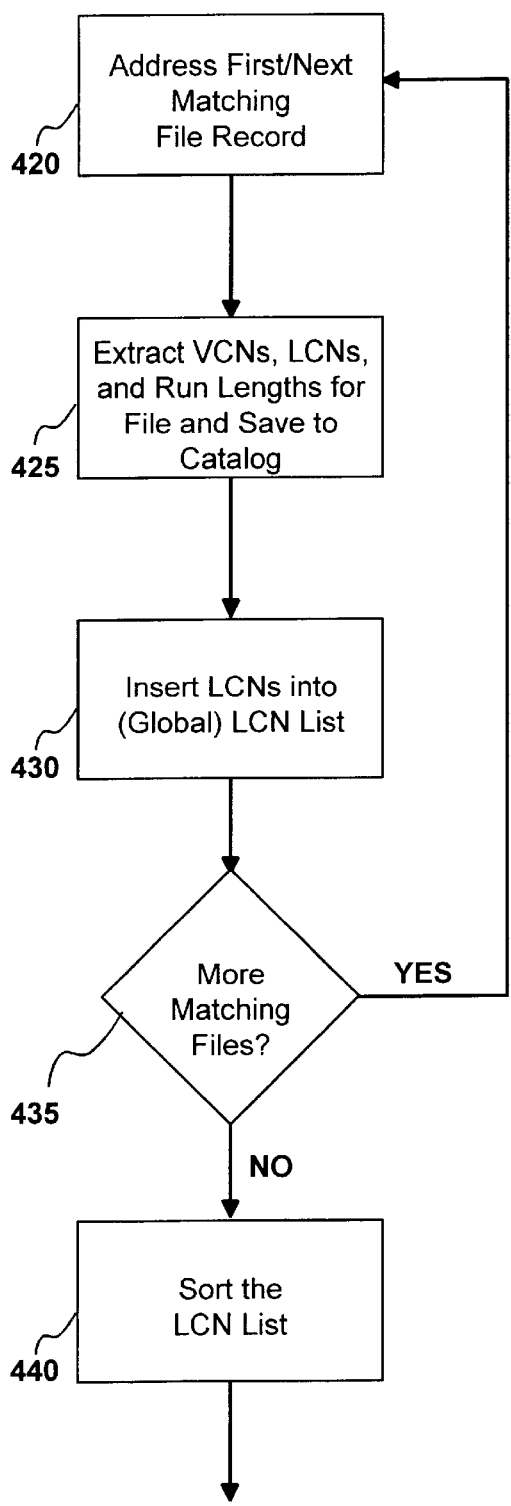
Figure 4C:
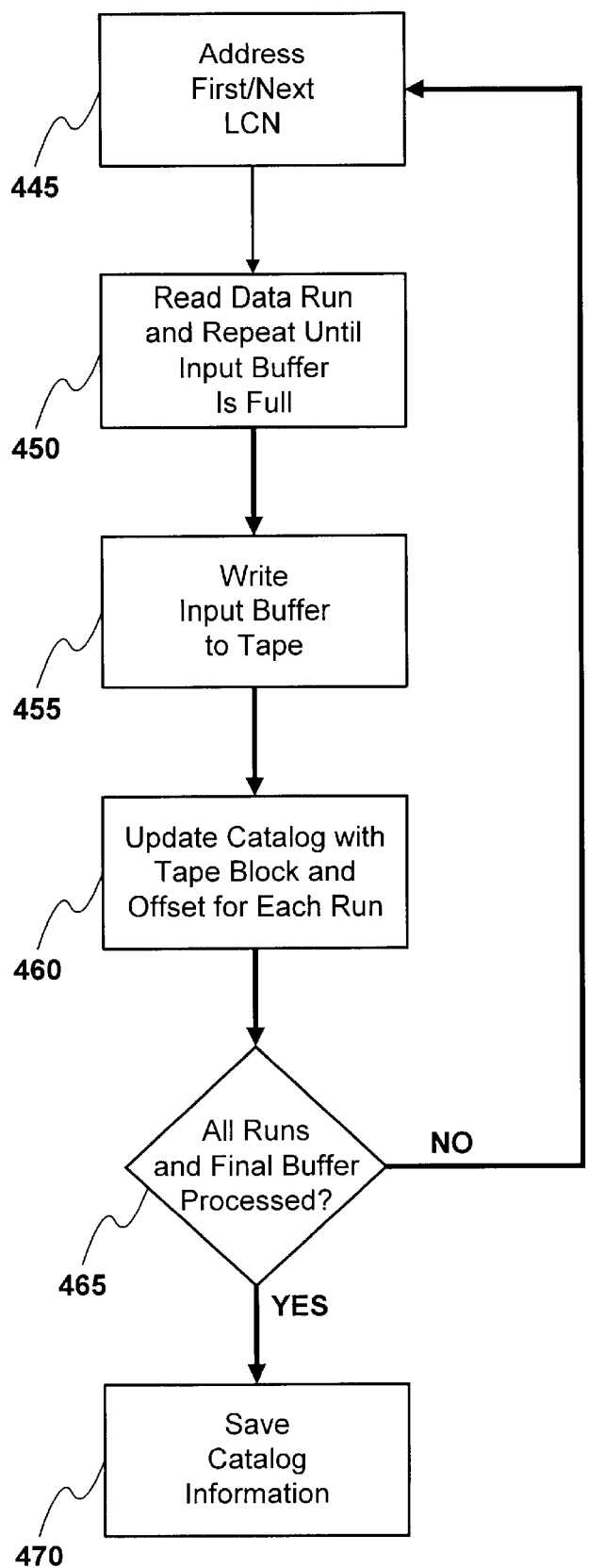

The preferred embodiment of the invention is illustrated in FIGS. 4A–4C, and described in the text that follows. The preferred embodiment is a distributed backup system implemented under the Microsoft Windows NT operating system, operating on large disk storage devices which have been formatted under the NTFS file system. Although the invention has been most specifically illustrated with a particular preferred embodiment, it should be understood that the invention concerns the principles by which such embodiment may be constructed, and is by no means limited to the specific configuration shown.

Figure 1:
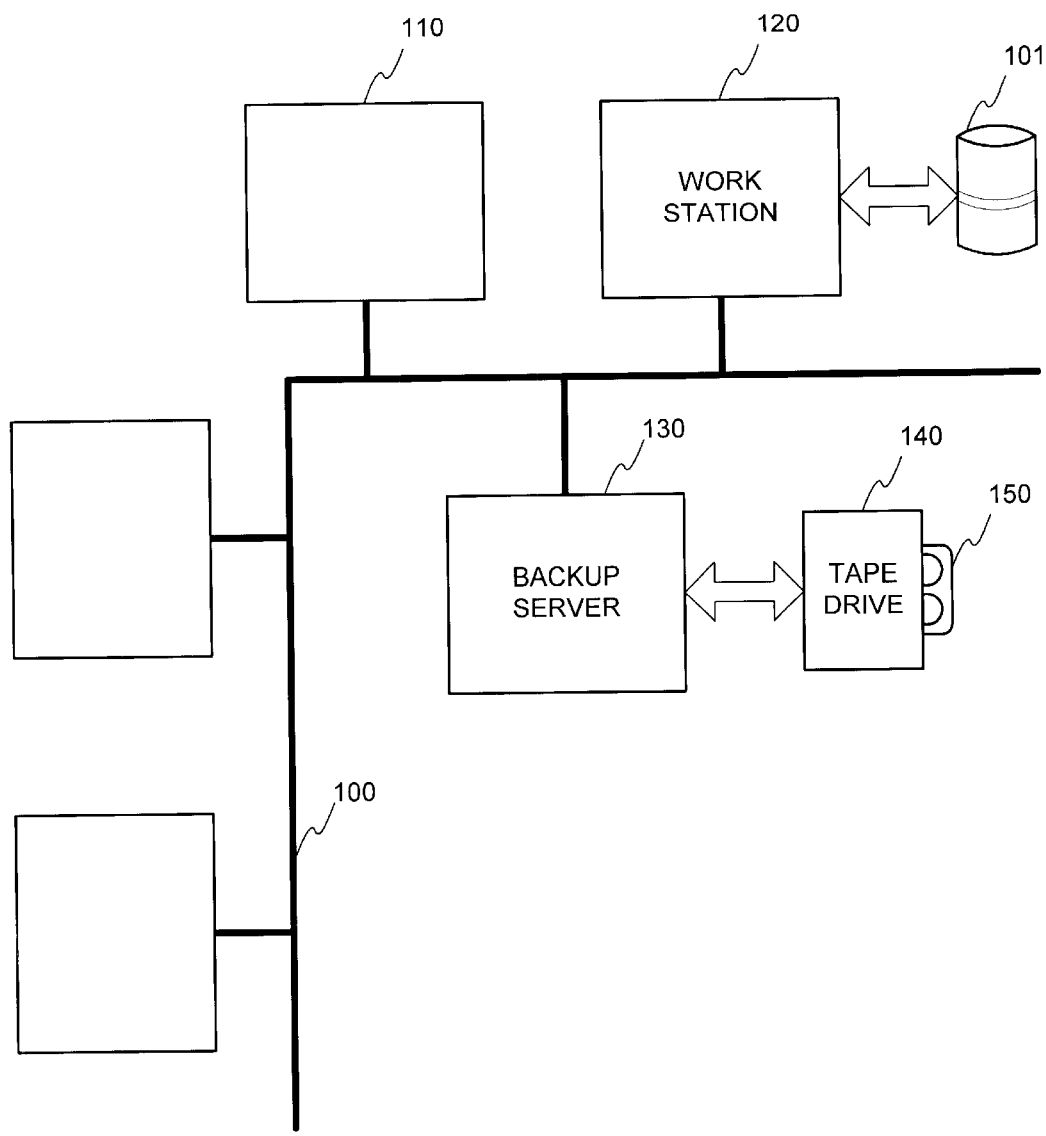
FIG. 1 shows an exemplary configuration of machines and devices on a distributed network which require backup, including a system on the network designated to perform the backup.

As shown in FIG. 1, there may be a plurality of machines and devices, 110, 120, etc. on a network 100 that require backup services. For example, a workstation 120 on the network may have disk drive 101 locally attached to it which contains important data of the enterprise and therefore requires periodic backup. A system 130 may be designated on the network for the purposes of providing such backup services. System 130 may have locally attached to it a backup device 140 containing removable backup media such as cartridge tape 150. The network may be a local area network, a wide area network or the Internet (in which case the devices on the network could be widely separated). Indeed, a network is not necessary, in that workstations, whether or not connected to a network, are sometimes outfitted with backup systems which are used to back up the workstation itself.

Figure 2A:
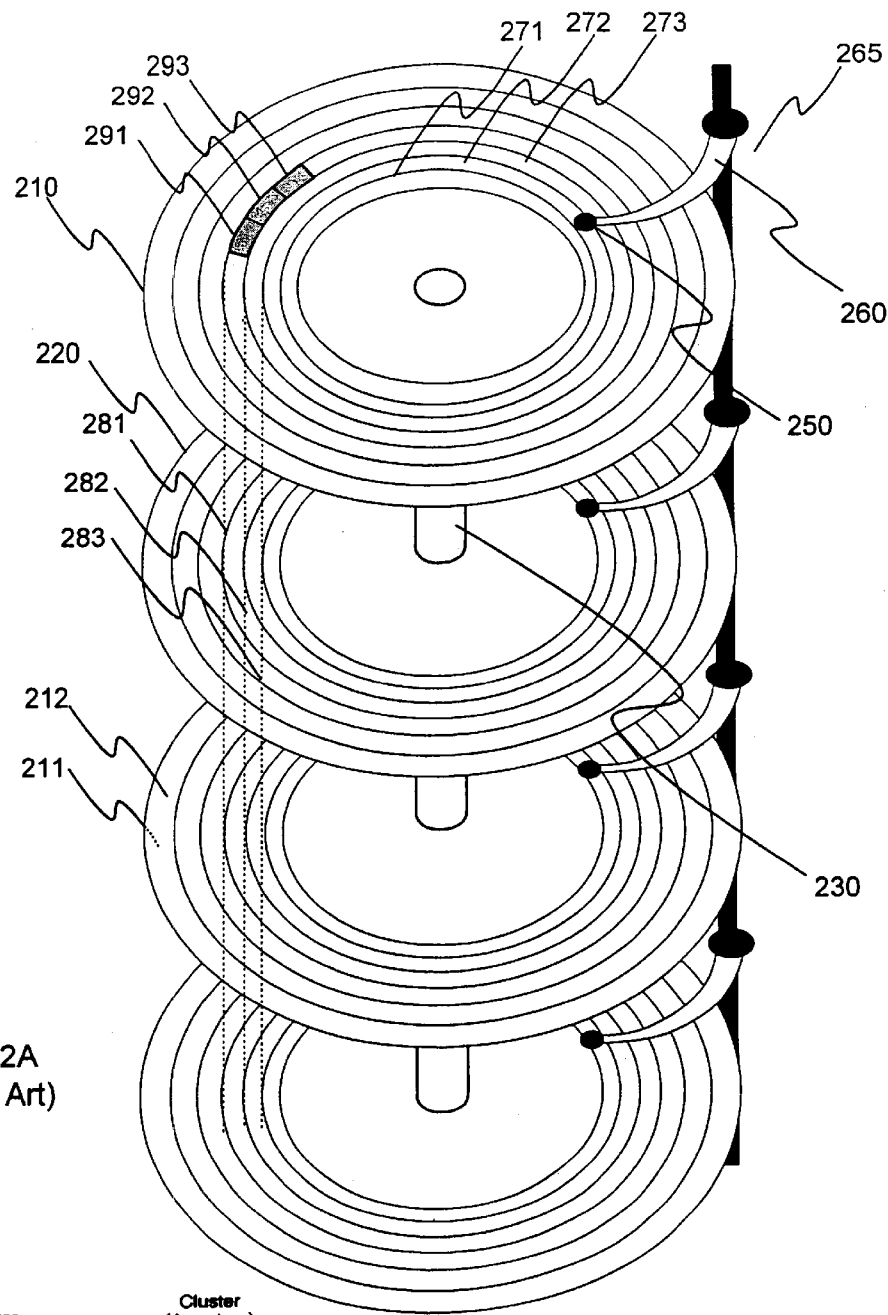
FIG. 2A is diagram showing the geometry of an exemplary disk drive storage device.

A possible geometry for disk drive 101 is shown in FIG. 2A. The storage areas of the device comprise a plurality of stacked platters 210, 220, etc. . . . which spin in unison on a spindle 230. Each platter has two surfaces, 211, 212, one or both of which may be used for data storage.

The surfaces are accessed with one or more read/write heads 250, etc. mounted on corresponding arms 260, etc., which are also movable in unison as a single structure 265 in a stepwise fashion so as to address narrow concentric rings 271, 272, 273, etc. on each surface. These rings are called "tracks." The movement of arm structure 265 is such that the read/write heads move in and out across the surface so as to address tracks at different radii from the center of the spindle.

A set of vertically stacked tracks (i.e., one for each surface) is called a "cylinder" (281, 282, 283, etc.). Within each track are a series of "sectors" (291, 292, 293 etc.).

The term "latency" refers to the rotation time delay in having a given sector spin around so as to be under the corresponding head. The term "seek" time refers to the time delay resulting from having to reposition the read/write arm structure 265 so as to address a different set of tracks. Of all disk operations, seeking a new cylinder is by far the most time consuming.

Conventionally, data stored in disk files are physically written on the disk in fixed length data units which are sometimes referred to as "blocks." Under the NTFS file system employed in connection with the preferred embodiment, the term "cluster" is most often used to denote such blocks.

Figure 2B:
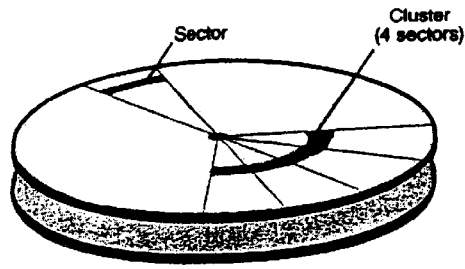
FIG. 2B is a diagram representing sectors and a cluster on an exemplary disk.

Under the NTFS file system, a "sector" generally consists of 512 bytes, and a "cluster" consists of a power-of-two multiple number of sectors. One example showing a cluster size of four sectors is shown in FIG. 2B. In most situations involving a volume size in excess of 2 gigabytes, a "cluster" comprises eight sectors, thereby providing 4,096 bytes (4K) of storage.

The NTFS stores disk directory and file information in a Master File Table (MFT). The MFT holds numerous disk, directory and file attributes. Within the information maintained on each file in the MFT are two series of cluster numerations, which keep track of data clusters in a file. The first, the "Virtual Cluster Number" (VCN), refers to the order of the data in the file, starting at 0 and running to the last cluster, for example, the mth cluster. The second number, the "Logical Cluster Number" (LCN) represents the numbering of all physical clusters, from the beginning of the volume to the end. LCNs may be converted to a physical disk address by multiplying the LCN by the cluster factor (number of bytes per cluster) to get the physical byte offset on the volume. From this, the disk driver interface can readily calculate platter, track and sector addresses so as to accurately position the disk read head.

Note that there is nothing that requires that the VCNs denoting the data clusters comprising a file to be stored in a contiguous manner on the disk, or even that they be recorded in order. Indeed, as discussed above, it is very often the case that a file's VCNs are neither contiguous or in order.

Figure 3:
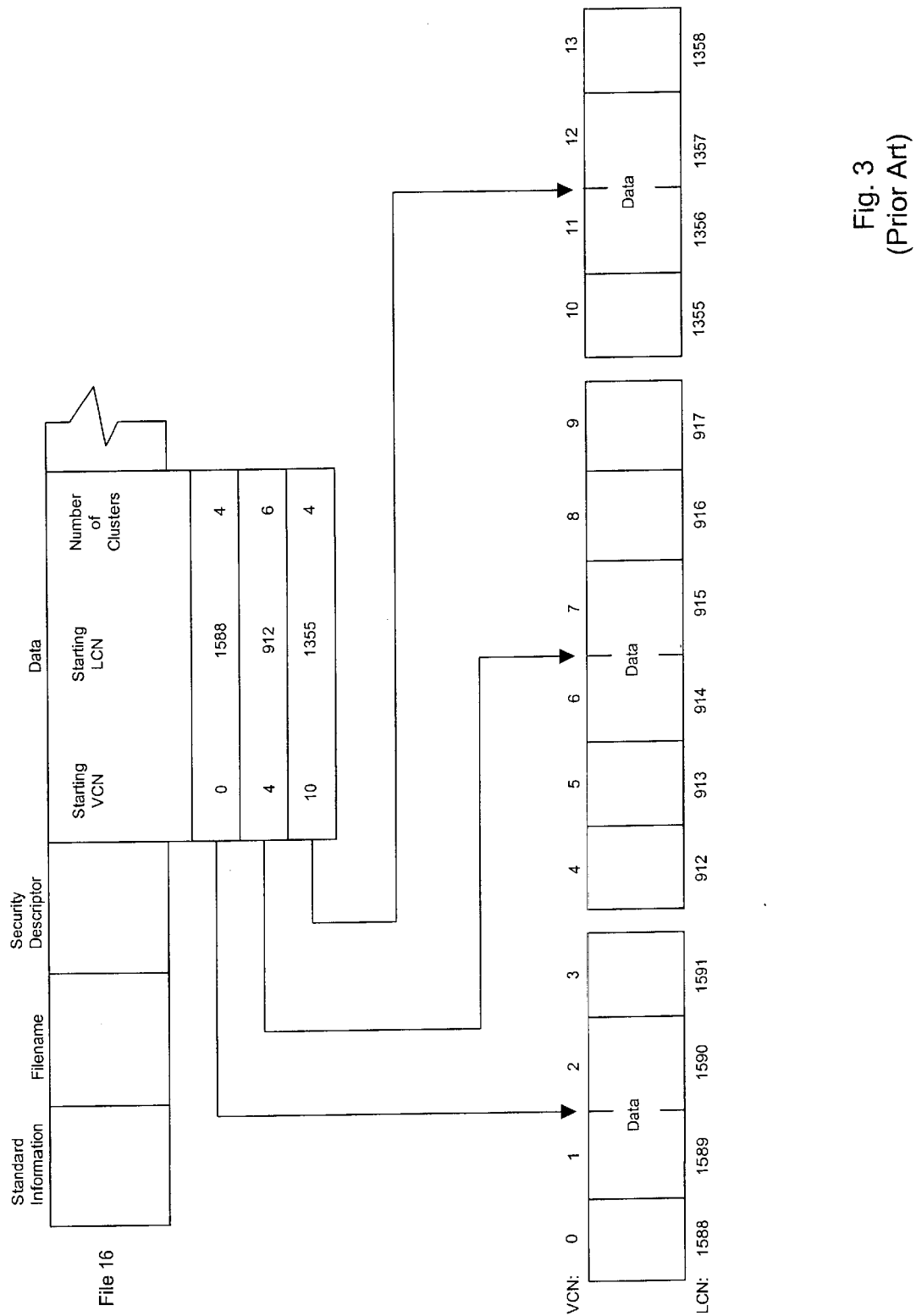
FIG. 3 is a diagram of VCN to LCN cluster and data "Run" mappings for an exemplary large data file under the NTFS file system.

File data are stored in "Runs" each comprising a plurality of contiguous clusters, or in some cases a single isolated cluster. For each Run, there is stored in the MFT a record of the starting VCN, the starting LCN, and the number of clusters in the Run. Thus, the physical location and logical order of all of the data in the file is accounted for. A representative layout of a typical large file under NTFS (showing data contents fragmented and not in physical order) is shown in FIG. 3.

The operation of the preferred embodiment can now be explained with reference to the disk and file structures described above.

FIGS. 4A, 4B and 4C comprise various sections of a flow chart showing the principal processing steps of the preferred embodiment.

In accordance with these flow charts, processing begins at step 405, by reading the selection criteria supplied by the user. The "selection criteria" constitute the specifications for what is to be included in the backup set, possibly including an inclusion list, and exclusion list, and selected time/date criteria and/or other attributes (including without limitation any attribute supported by the target file system(s)). In the case of an incremental backup, the selection criterion would include a modification date/time criterion such that all files with a date and time of modification later than the supplied date and time of the previous backup set are backed up. Thus, no special algorithm is necessary to perform an incremental backup; such a backup results simply from the choice of appropriate selection criteria. Of course other selection criteria may be used to limit the range of what is being backed up, for example, files in a particular set of directories; a set of files excluding a certain list; files owned by a certain owner, etc. as desired.

The target storage volume or volumes for the backup can be determined from the selection criteria. This is done in step 410. We will assume for purposes of illustration that the target volume is a single disk volume which has been formatted for the NTFS file system.

The next step 415 is to read the Master File Table (MFT) from the target volume. The MFT may be located on the disk by following a reference in the drive's boot record.

The next step 420 is to traverse the set of files identified in the MFT, addressing those files that match the selection criteria (i.e., the files that the user designated for backup). Such traversal may be effected using any of a number of well-known algorithms, for example depth-first or breadth-first algorithms commonly employed for traversing tree-structured file systems.

For each selected file (see loop 420–435), the information regarding the file is extracted 425 from the MFT, including the VCNs, LCNs and Run lengths of the cluster Runs comprising the file, as well as any other attributes desired for other purposes. This information is saved for the backup Catalog. (The information is referred to herein as "the Catalog," but during the backup processing this information is held in an in-memory data structure which may or may not be identical in structure to the Catalog eventually saved when the backup is completed.)

In addition to extracting data about the file for the Catalog, the LCNs so retrieved in connection with such extraction are also added 430 to a global list of the LCNs for all starting clusters, of all Runs, for all files included in the backup. This "LCN List" consists entirely of a list of cluster numbers. The associated information, such as the file name that the Run belongs to, and the corresponding VCN designations, can readily be obtained by lookup in the Catalog.

After all of the required information for the selected files has been extracted from the MFT and saved, the (global) LCN list is sorted 440, using any suitable sorting algorithm, preferably a high-performance sort such as SyncSort NT™, a product of Syncsort Incorporated, assignee of the present application. The result is a list of cluster addresses arranged in a monotonic sequence. The Runs of specified lengths, beginning at these LCNs, may then be entirely read in one linear sweep of this disk. While this may require a series of head seeks, they are all in the same direction, and the sum of the length of all head movements is limited and in fact equal to the physical span from the first to the last cluster included in the backup. This is potentially a very substantial saving in head movement as compared with reading the backup set in VCN order.

The backup copying is performed as follows: Starting from the lowest sorted LCN number 445, the system reads the specified number of clusters (i.e., the corresponding Run-length), starting from the designated LCN, into a buffer, the size of which is preferably equal to an integral multiple of the cluster size 450. This read process (440) is repeated (advancing each time to the next LCN and Run), until a buffer-full of clusters has been read from the disk. A double or rotating buffer scheme is employed, and in order to completely fill buffers, Runs are split as necessary between the end of one buffer-full and the beginning of the next. Exact buffer size is a matter of tuning, and will vary from system to system.

As each buffer-full is completed, the buffer is written 455 to the backup medium, here assumed to be tape (though any storage medium could be used).

As buffers are written to tape, the Catalog information is updated 460 with the corresponding tape Block and Offset numbers, so that files and their data components can be located and restored from the backup set.

This processing is carried on (loop 445–465) until the last LCN and corresponding Run has been read from disk and written to tape 465. Finally, the Catalog information is saved 470 in the desired location.

In addition to what has just been described, other modes of operation are possible. For example, a total backup can be performed of all files, in which case the sorting step 440 can be eliminated, and all blocks read in physical sequential order. Directory information is still read from the MFT in such a case so as to facilitate file-by-file restoration. In such a mode of operation, an economy can readily be achieved by checking for a "high water mark" of the disk—the highest cluster number that has been written (some operating systems specially record this number, or it can be readily derived from a search of the directory), and performing the backup scan only up to that cluster.

While the present invention has been described by reference to a particular implementation in connection with the NTFS file system, it is well known to those skilled in the art that conceptually, the basic layout and organization of that file system is very similar to file systems encountered under the UNIX and common mainframe operating systems, as well as to somewhat more limited FAT scheme employed under MS-DOS. The method of the present invention may be readily adapted any of such operating systems and files systems, and will perform correspondingly well in those respective environments.

It is apparent from the foregoing that an improved method of performing a high-performance backup has been developed that accomplishes the stated objects of the invention. While the presently existing embodiment has been described in detail, it will be apparent to those skilled in the art that the principles of the invention are readily adaptable to other hardware configurations and operating systems without departing from the scope and spirit of the invention, as defined in the following claims.

I claim:

1. A method for performing a backup to specified backup media of certain data to be backed up which is stored on one or more disk or other random access data storage devices, said data to be backed up being organized in files or other data aggregations, and such device or devices having a working directory containing information on where the data comprising said files or other groups of data are physically stored on said random access storage device or devices, said method comprising:
   a) prior to reading any of said data to be backed up, reading said working directory to determine all of the blocks associated with the set of files or other data aggregations for backup;
   prior to reading any of said data to be backed up
   b) ordering the block numbers read from said working directory, thereby determining a sequential order for reading from said random access storage device or devices the data to be backed up;
   c) reading the data to be backed up from said random access storage device or devices in accordance with said determined sequential order, and writing said data to the backup media; and
   d) storing on the backup media, or on other suitable media, a catalog comprising organizational information specifying where the data comprising said files or data aggregations within the backed up data set are physically stored on said backup media.

2. A method for performing a backup to specified backup media of some or all files which are stored on a disk volume, in the form of a direct access storage device such volume having a working directory containing information on where the data comprising said files are physically stored on said volume, said method comprising:
   a) reading said working directory to determine the physically contiguous runs of data on said disk volume associated with said
   prior to reading any of said data comprising said files to be backed up, files, and information about the location of said runs on said disk volume;
   b) sorting said location information with regard to all of said runs and thereby determining the of said runs on said disk volume;
   c) sequentially reading all blocks of data from said runs in accordance with said determined physical order, and writing said data to the backup media; and
   d) storing on the backup media, or on other suitable media, a catalog comprising organizational information specifying where the data comprising said files or data aggregations within the backed up data set are physically stored on said backup media.

3. A method for restoring a specified file contained within a backed up data set which has been created in accordance with the methods of claims 1 or 2, further comprising:
   a) searching said catalog, and extracting therefrom information specifying the physical location and order in said backup media of the data comprising said file;
   b) reading data from said backup media in accordance with said extracted ordering information; and
   c) restoring the data so read from said backup media to target media for such restoration, and updating the corresponding working directory information on said target media.

4. An article of manufacture comprising a data storage medium on which there has been recorded a computer program which, when executed on a suitable computer system, performs a method of claim 3.

5. A system comprising a general purpose digital computer in which there has been loaded into the appropriate memory and instruction storage areas a computer program which, when executed, performs a method of claim 3.

6. An article of manufacture comprising a data storage medium on which there has been recorded a computer program which when executed on a suitable computer system performs the methods of claims 1 or 2.

7. A system comprising a general purpose digital computer in which there has been loaded into the appropriate memory and instruction storage areas a computer program which when executed performs the methods of claims 1 or 2.

* * * * *

UNITED STATES PATENT AND TRADEMARK OFFICE
CERTIFICATE OF CORRECTION

PATENT NO.    : 6,415,300 B1
DATED         : July 2, 2002
INVENTOR(S)   : Liu

It is certified that error appears in the above-identified patent and that said Letters Patent is hereby corrected as shown below:

<u>Column 5,</u>
Line 67, please delete.

<u>Column 6,</u>
Lines 14 to 19, please replace "Claim 2" with the following:

2. A method for performing a backup to specified backup media of some or all files which are stored on a disk volume in the form of a direct access storage device, such volume having a working directory containing information on where the data comprising said files are physically stored on said volume, said method comprising:

Lines 20 to 25, please replace "section a) of Claim 2" with the following:

a) prior to reading any of said data comprising said files to be backed up, reading said working directory to determine the physically contiguous runs of data on said disk volume associated with said files and information about the location of said runs on said disk volume;

Lines 27 to 29, please replace "section b) of Claim 2" with the following:

b) sorting said location information with regard to all of said runs and thereby determining the physical order of said runs on said disk volume;

Signed and Sealed this

Seventeenth Day of December, 2002

JAMES E. ROGAN
*Director of the United States Patent and Trademark Office*